(12) United States Patent
Kondrasovs et al.

(10) Patent No.: US 9,897,704 B2
(45) Date of Patent: Feb. 20, 2018

(54) SCINTILLATOR FOR DETECTING NEUTRONS AND/OR GAMMA PHOTONS AND ASSOCIATED DETECTOR

(71) Applicant: Commissariat à l'énergie atomique et aux énergies alternatives, Paris (FR)

(72) Inventors: Vladimir Kondrasovs, Palaiseau (FR); Romain Coulon, Chaulgnes (FR); Stéphane Normand, Isigny le Buat (FR); Karim Boudergui, Nogent-le-Phaye (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/759,014

(22) PCT Filed: Jan. 6, 2014

(86) PCT No.: PCT/EP2014/050074
§ 371 (c)(1),
(2) Date: Jul. 2, 2015

(87) PCT Pub. No.: WO2014/106652
PCT Pub. Date: Jul. 10, 2014

(65) Prior Publication Data
US 2015/0346362 A1    Dec. 3, 2015

(30) Foreign Application Priority Data
Jan. 7, 2013    (FR) ...................................... 13 50084

(51) Int. Cl.
*G01T 1/20* (2006.01)
*G01T 1/203* (2006.01)
*G01T 3/06* (2006.01)

(52) U.S. Cl.
CPC ............ *G01T 1/2008* (2013.01); *G01T 1/203* (2013.01); *G01T 3/06* (2013.01)

(58) Field of Classification Search
CPC .......... G01T 1/2008; G01T 1/203; G01T 3/06
See application file for complete search history.

(56) References Cited

U.S. PATENT DOCUMENTS 7,244,947 B2 *  7/2007  Polichar ................... G01T 3/06
                                                        250/367
2004/0262530 A1  12/2004  Reber
(Continued)

FOREIGN PATENT DOCUMENTS

GB    1497367 A  *  1/1978  ............. G01T 1/203
WO   20121133796 A1    10/2012

OTHER PUBLICATIONS

Matthieu Hamek et al., "N-(2', 5'-di-t-butylphenyl)-4-ethoxy-1,8-naphthalimide: A new fluorophore highly efficient for fast neutrons/gamma-rays discrimination in liquid media" Nuclear Instruments and Methods in Physics Research A, vol. 602, 2009.
(Continued)

*Primary Examiner* — Christine Sung
(74) *Attorney, Agent, or Firm* — Pearne & Gordon LLP

(57) ABSTRACT

The invention relates to a scintillator for detecting neutrons and/or gamma photons, characterized in that it comprises a structure consisting of two undoped plastic materials for detecting neutrons and which contain different fluorescent complexes, a first plastic material containing at least one fluorescent complex able to produce a fluorescence light having a first relaxation time and the second plastic material containing at least one fluorescent complex able to produce a fluorescence light having a second relaxation time higher than the first relaxation time.

8 Claims, 3 Drawing Sheets

(56) References Cited

U.S. PATENT DOCUMENTS

| | | | |
|---|---|---|---|
| 2006/0054863 A1* | 3/2006 | Dai | B82Y 10/00 |
| | | | 252/301.4 R |
| 2008/0191140 A1* | 8/2008 | McDevitt | G01T 1/202 |
| | | | 250/390.11 |
| 2011/0163237 A1* | 7/2011 | Akers | G01T 1/203 |
| | | | 250/362 |
| 2011/0204243 A1 | 8/2011 | Bendahan | |
| 2011/0291014 A1 | 12/2011 | Kusner | |
| 2012/0166120 A1 | 6/2012 | Corre | |
| 2012/0241630 A1* | 9/2012 | Walker | G01T 1/2033 |
| | | | 250/362 |
| 2012/0318998 A1 | 12/2012 | Kondrasovs | |
| 2013/0026371 A1* | 1/2013 | Holloway | G01T 1/16 |
| | | | 250/362 |
| 2013/0299742 A1 | 11/2013 | Hamel | |
| 2014/0312236 A1 | 10/2014 | Kondrasovs | |

OTHER PUBLICATIONS

Search Report issued in French Patent Application No. FR 13 50084 dated Sep. 20, 2013.
International Search Report issued in Application No. PCT/EP2014/050074 dated Mar. 27, 2014.
U.S. Appl. No. 14/761,466, "Method for Detecting a Moving Radioactive Source and Associated Device" filed Jul. 16, 2015.

\* cited by examiner

SCINTILLATOR FOR DETECTING NEUTRONS AND/OR GAMMA PHOTONS AND ASSOCIATED DETECTOR

TECHNICAL FIELD AND PRIOR ART

The invention relates to a scintillator for detecting neutrons and/or gamma photons. The invention also relates to a neutron and/or gamma photon detector which comprises a scintillator according to the invention.

The invention is applicable, for example, in the medical field, in the safety field, in radiation protection or even in dismantling nuclear facilities.

During a terrorist attack or a dismantling of nuclear facilities, it is essential to monitor and characterise the ambient radioactivity. The ambient radioactivity is then a mixed radioactivity comprised of fission neutrons and gamma radiations. Whilst it is easy to measure the gamma radiations, fission neutrons are difficult to measure because of the predominance of the gamma radiations and the similarity in the concerned energy ranges between neutrons and gamma radiations.

A usual approach to the neutron detection consists in developing components maximizing the interaction cross-section of the neutrons with respect to the interaction cross-section of the photons. The criterion for designing detectors is therefore the use of doped scintillator materials (the material itself, the dopants or the blankets) having a high capture cross-section for neutrons. By "doped" scintillator, it should be understood that the material making up the scintillator contains dopants specific to neutron detection.

The most significant neutron capture cross-sections are reached for capture reactions on nuclei as helium 3 (n,p), boron 10 (n,α), lithium 6 (n,α), or even uranium 235 (n,f). However, the utilization of these reactions requires a prior thermalization of the neutrons by use a high amount of strongly hydrogenated materials, for example a sphere of hydrogen material of the Bonner sphere-type (polyethylene or paraffin). These systems thereby measure thermal neutrons. Patent application US 2011/0291014 discloses such a system. The sensitivity to emitter neutrons of these systems is only improved at the expense of a high overall space. As a result, these are actually neutron detectors having great dimensions (typically a diameter of 25 cm) and which are heavy (typically around ten kilogrammes).

Another approach consists in detecting recoil protons resulting from the slowing down of fast neutrons in hydrogen material. Organic, liquid or plastic scintillators are used for this technique. Because of the different energy linear deposition between the recoil electrons and the recoil protons, the neutron discrimination is based on differences in populations between triplet excitation states and singlet states of the fluorophores incorporated into the scintillator crystals. Since the fluorescence relaxation time is different depending on the excitation states, it is possible to implement a discrimination by analysing the pulse shape. These methods are particularly efficient and proven for liquid scintillators [Cf. <<N-(2',5'-di-t-butylphenyl)-4-ethoxy-1,8-naphthalimide: A new fluorophore highly efficient for fast neutrons/gamma-rays discrimination in liquid media>>/ Nuclear Instruments and Methods in Physics Research A, 602:425-431, 2009.].

However, liquid scintillators are too restricting for a portable-use system wherein it is imperative that the tightness is ensured in order to avoid leaks of the liquid which is both toxic and flammable. Liquid scintillators also raise the problem of the quick deterioration in their performance over time (propensity to absorb agents as oxygen requiring frequent degassings).

Other detection systems are knowns (time of flight measurement between two detectors, double or triple coincidence detection systems, etc.) which enable neutrons to be discriminated with respect to gamma radiations. However, these detection systems have a high power consumption and a low detection efficiency, which makes them incompatible with making a portable-use system.

The neutron detection system of the invention does not have the above-mentioned drawbacks.

DISCLOSURE OF THE INVENTION

Indeed, the invention relates to a scintillator for detecting neutrons and/or gamma photons, characterised in that it comprises a structure consisting of two undoped plastic materials which contain different fluorescent complexes, a first undoped plastic material containing at least one fluorescent complex able to produce a fluorescence light having a first relaxation time and the second undoped plastic material containing at least one fluorescent complex able to produce a fluorescence light having a second relaxation time higher than the first relaxation time. Preferentially, the second relaxation time is substantially higher than or equal to ten times the first relaxation time. The first and second undoped plastic materials are, for example, polystyrene (PS) or polyvinyltoluene (PVT). By "undoped" plastic, it should be understood that the plastic contains no dopant specific to the neutron detection.

In the following description, the phrases "scintillator material" and "fluorescence material" should be understood as "undoped plastic material for neutron detection and containing one (or more) fluorescent complex(es)".

According to a first embodiment of the invention, both scintillator materials are arranged as a stack of successive layers, a layer of one of both fluorescent materials alternating with a layer of the other fluorescent material, the thickness of each layer of fluorescent material being substantially between 100 μm and 500 μm.

According to a second embodiment, both scintillator materials are arranged as a set of micro-beads made of one of both scintillator materials inserted in a block made of the other scintillator material, the micro-beads defining a cube lattice inside the other scintillator material, a diameter of a micro-bead and a distance which separates two micro-beads of a same cube lattice being substantially between 100 μm and 500 μm.

According to the invention, the distance on which both scintillator materials alternate (i.e. the thickness of the layers or the diameter of the micro-beads and the distance which separates them) is substantially equal to the order of magnitude of the pathway of the recoil protons. A recoil proton thus deposits its entire kinetic energy in a single scintillator material whereas a recoil electron deposits its kinetic energy, alternately, in both scintillator materials.

As already mentioned previously, one advantage of the invention is to use plastic materials having the same polymeric matrix, for example polystyrene (PS) or polyvinyltoluene (PVT) and which incorporate no dopant specific to neutron detection. In order to achieve the desired different relaxation times, the plastic materials contain different fluorescent complexes.

As is known to those skilled in the art, a fluorescent complex is most often a combination of fluorophores. Fluorophores typically used within the scope of the invention can be, for example, POPOP (1,4-bis-(2-(5-phenyloxazolyl)benzene), PPO (2,5-Diphenyloxazole), Bis MSB (1,4-Bis(2-methylstyryl)benzol), Butyl PBD (2,[4-biphenylyl]-5-[4-tert-butylphenyl]-1,3,4-oxadiazole), p-terphenyl (1,4-Diphenylbenzene), Anthracene, DPA (diphenyl anthracene), biphenyl, etc.

In a known manner per se, fluorescent complexes are then chosen to ensure the desired different relaxation times.

The invention also relates to a neutron and/or gamma photon detector, characterised in that it comprises scintillator according to the invention, which delivers a fluorescence signal when a neutron or gamma photon is detected, a photomultiplier which converts into an electronic pulse the fluorescence signal delivered by the scintillator and a discriminating module to discriminate, from the shape of the electronic pulse delivered by the photomultiplier, whether a neutron or a gamma photon has been detected.

One advantage of the invention is to allow the making of a portable neutron detector, with a low power consumption and a low manufacturing cost. Another advantage of the invention is to allow fast neutrons to be detected without prior thermalization of the neutrons.

BRIEF DESCRIPTION OF THE FIGURES

Further characteristics and advantages of the invention will appear upon reading the description that follows made with reference to the appended figures from which.

In all the figures, the same references refer to the same elements.

DETAILED DISCLOSURE OF PREFERENTIAL EMBODIMENTS OF THE INVENTION

Figure 1:
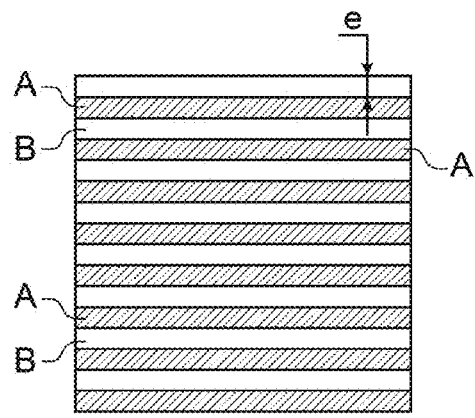
FIG. 1 represents a scintillator for detecting neutron and/or gamma photons according to a first embodiment of the invention.

FIG. 1 represents a scintillator for detecting neutron and/or gamma photons according to a first embodiment of the invention The scintillator is a multi-layer phoswich (contraction of "phosphor sandwich") scintillator. The multi-layer phoswich scintillator consists of a stack of layers. The layers are formed from two different scintillator materials (i.e. undoped plastic materials for neutron detection and containing different fluorescent complexes), a layer made from a first scintillator material A alternating with a layer made from a second scintillator material B. If the first scintillator material A produces a fluorescence light the relaxation time of which is short, then the second scintillator material B produces a fluorescence light the relaxation time of which is long. Conversely, if the first scintillator material A produces a fluorescence light the relaxation time of which is long, then the second scintillator material B produces a fluorescence light the relaxation time of which is short. As already mentioned previously, different fluorescent complexes are chosen, in a known manner per se, to ensure the different relaxation times.

The ratio of the long relaxation time to the short relaxation time is preferentially higher than 10. Thus, the short relaxation time can be substantially equal to 2 ns whereas the long relaxation time is between 200 ns and 300 ns. By way of non-limiting example, the fluorescent material the relaxation time of which is short is BC-404 from Saint-Gobain® and the fluorescent material the relaxation time of which is long is BC-444 from Saint-Gobain®. The thickness e of the layers is, for example, equal to 200 µm. The method implemented to make the stack of layers is known per se (method for manufacturing phoswhich detectors). It consists, for example, in bonding the layers the one over the other using an optical adhesive.

Figure 2:
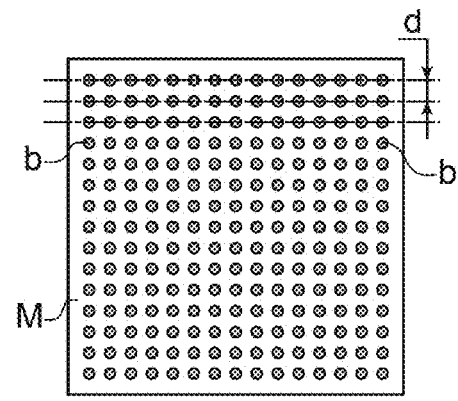
FIG. 2 represents a scintillator for detecting neutron and/or gamma photons according to a second embodiment of the invention.

FIG. 2 represents a scintillator for detecting neutron and/or gamma photons according to a second embodiment of the invention The scintillator has the form of micro-beads b made of a first fluorescent material, which are inserted in a block M made of a second fluorescent material. By way of non-limiting example, the micro-beads b distributed in the block M define a cube lattice. According to a first alternative of the second embodiment of the invention, the micro-beads are made with a fluorescent material which produces a fluorescent light the relaxation time of which is short and the block M is made with a fluorescent material which produces a fluorescence light the relaxation time of which is long. According to a second alternative of the second embodiment of the invention, it is the micro-beads b that are made with a fluorescent material which produces a fluorescence light the relaxation time of which is long and the block M that is made with a fluorescent material which produces a fluorescence light the relaxation time of which is short.

The fluorescent materials used in the second embodiment of the invention are identical to the materials used in the first embodiment. The diameter of the micro-bead is, for example, equal to 300 µm and the distance which separates two neighbouring micro-beads is for example between 100 µm and 500 µm.

The method for inserting micro-beads b into the block M consists, first, in forming a micro-bead powder with a mill, and then incorporating this powder into the block M upon forming the latter. The distribution of the micro-beads b in the block M should be properly made.

Figure 3A:
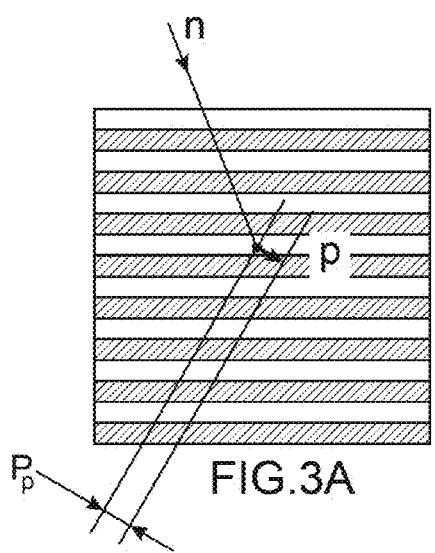
FIGS. 3A and 3B respectively illustrate the detection of a neutron and the detection of a gamma photon using a scintillator as represented in FIG. 1.
Figure 4A:
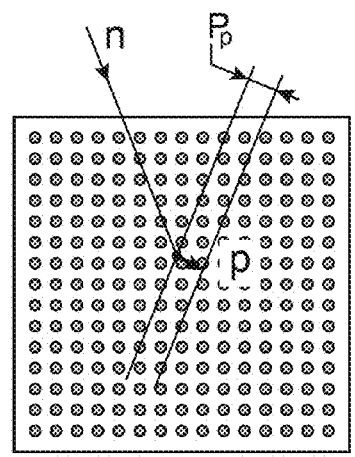
FIGS. 4A and 4B respectively illustrate the detection of a neutron and the detection of a gamma photon using a scintillator as represented in FIG. 2.
Figure 3B:
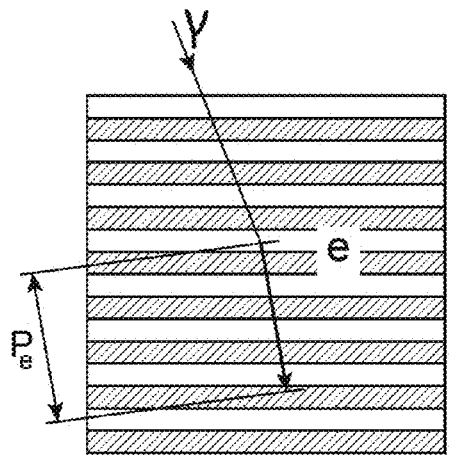
Figure 4B:
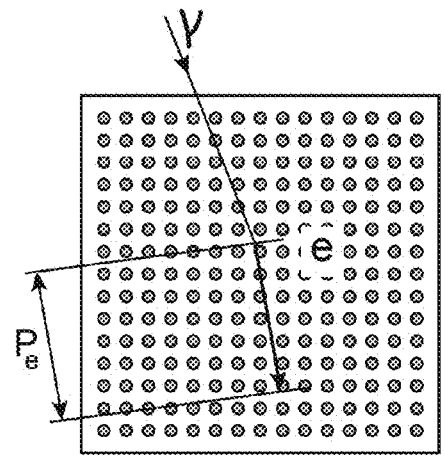

FIGS. 3A and 3B respectively illustrate the detection of a neutron and the detection of a gamma photon using a scintillator as represented in FIG. 1 and FIGS. 4A and 4B respectively illustrate the detection of a neutron and the detection of a gamma photon using a scintillator as represented in FIG. 2.

When a neutron n is detected in a scintillator of the invention, a recoil proton p is emitted. Thereby, there is an ionization of the medium by the proton and creation of the fluorescence light. According to the invention, the portion of fluorescent material in which the photon p is emitted (layer A or B, micro-beads b, or block M) is sufficiently large with respect to the pathway $P_p$ of the proton for the latter to deposit its entire energy. In the case where the recoil proton is emitted in the material which produces a fluorescence light the relaxation time of which is short, the fluorescence signal then consists of a short duration pulse and, in the case where the recoil proton is emitted in the material which produces a fluorescence light the relaxation time of which is long, the fluorescence signal consists of a long duration pulse. The fluorescence signal which results from the detection of a neutron thus leads either to a short duration signal, or a long duration signal.

When a gamma photon is detected in a scintillator of the invention, a recoil electron is emitted. There is also an ionization of the medium by the electron and a creation of the fluorescence light. According to the invention, the portion of the material in which the electron is emitted is sufficiently small with respect to the pathway $P_e$ of the electron for the latter to deposit only part of its energy and keep its path by passing through either several successive layers of the stack of layers (in the case of the first embodiment of the invention) or several block M/micro-bead alternations (in the case of the second embodiment of the invention). The fluorescence signal emitted consequently comprises a short duration component and a long duration component, which leads to the formation of a composite signal formed by the sum of a short duration pulse and a long duration pulse. Concretely, the hierarchy of the durations (short, long, composite) is defined by thresholds which enable the duration of the measured pulses to be classified.

The scintillator of the invention thus advantageously leads to the formation of fluorescence signals having different shapes according to whether a neutron detection or a gamma photon detection is performed. This is this shape difference which is used to discriminate neutrons from gamma photons.

Within the scope of the invention, a dissymmetry in the fast fluorescence/slow fluorescence alternation can be introduced at the scintillator to improve discrimination. For example, if slow fluorescences have a lower proportion than fast fluorescences in the scintillator, the slow contribution of the photons will be reduced and the discrimination amplified. Concretely, this dissymmetry is then made by reducing the thickness of the fluorescent material able to produce a fluorescence light having a long relaxation time in comparison with the thickness of the fluorescent material able to produce a fluorescence light having a short relaxation time. This dissymmetry can be advantageously optimized depending on the concerned applications and, in particular, depending on whether the gamma background noise is significant or not (a compromise between sensitivity and discrimination).

Figure 5:
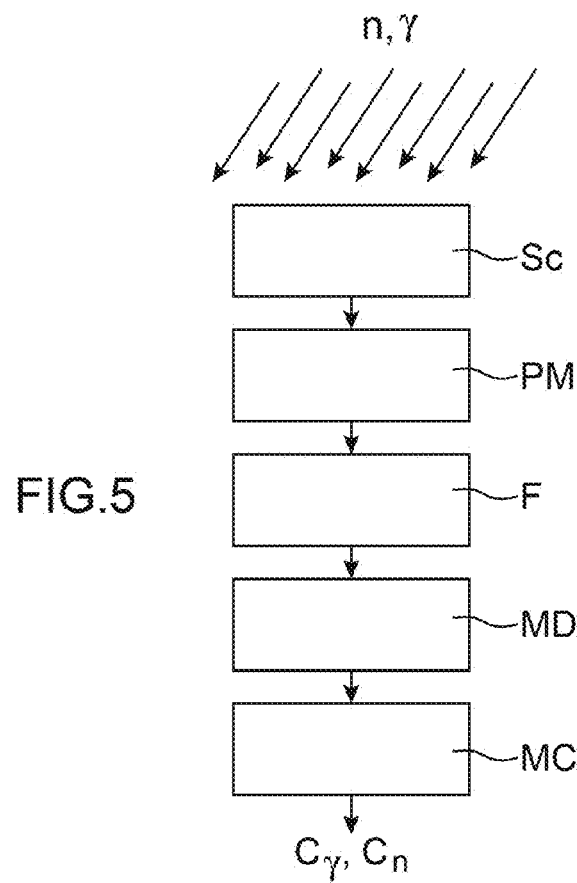
FIG. 5 represents a schematic diagram for a neutron and/or photon gamma detector according to the invention.

FIG. 5 represents a schematic diagram for a neutron and/or gamma photon detector according to the invention. The detector comprises a scintillator Sc in accordance with the invention, a photomultiplier PM, a filtering module F, a discriminating module MD and a counting and smoothing module MC, which are connected in series.

The photomultiplier PM converts the light delivered by the scintillator into electrons and delivers electronic pulses. The filtering module F removes the noise present in the electronic pulses. The discriminating module MD implements—in a known manner per se—a pulse shape discrimination technique. Each pulse is thereby classified depending on its shape. Any technique chosen from PSD ("Pulses Shape Discrimination") techniques known to date can be implemented within the scope of the invention.

Figure 6:
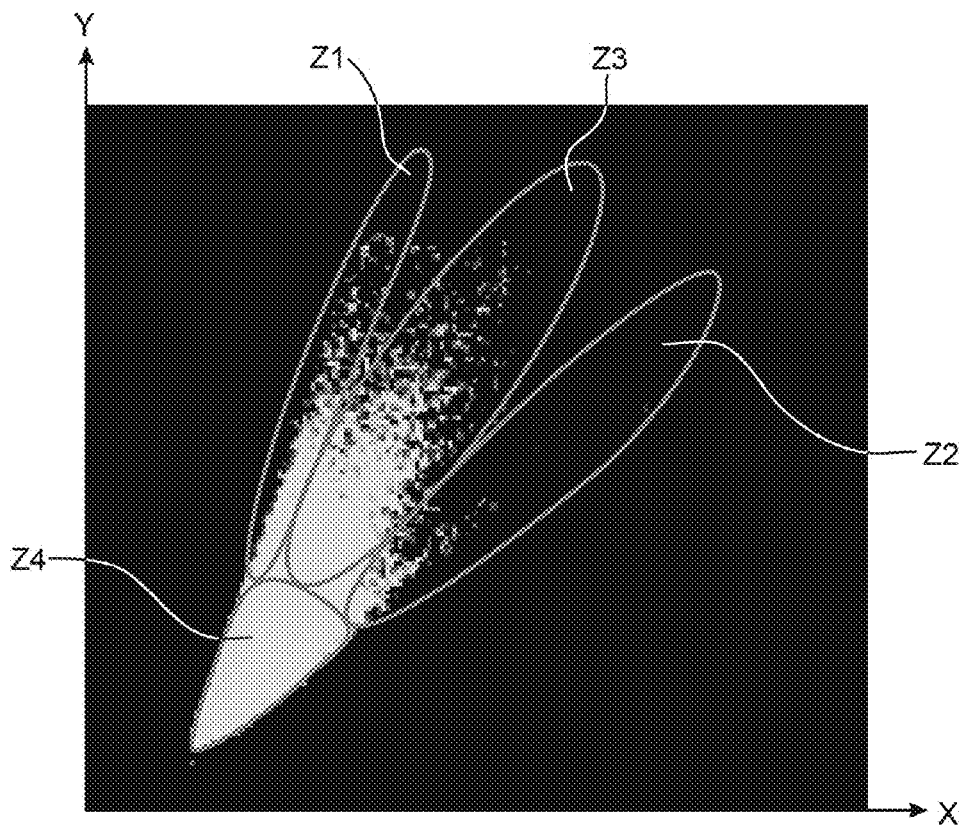
FIG. 6 illustrates neutron detection results in a mixed neutron/gamma photon environment with a detector of the invention.

FIG. 6 illustrates, by way of non-limiting example, a discrimination diagram obtained by implementing one of these techniques. The measured neutron and gamma photon emitting source is $^{252}$Cf. According to the chosen discrimination technique, each pulse is decomposed, in a known manner per se, into a fast component Pa and a slow component Pb. Each pulse is then positioned in a frame of reference (X,Y), where the axis of abscissa X is the axis of the slow components and the axis of ordinate Y is the axis of fast components. Four distinct regions appear in the frame of reference (X,Y):
- a first region Z1 corresponds to the pulses the fast component of which is high and the slow component is low;
- a second region Z2 corresponds to the case where the fast component is low and the slow component is high;
- a third region Z3 and a fourth region Z4 correspond to the case where the fast and slow components are substantially identical.

The regions Z1 and Z2 gather pulses which correspond to neutron detection. The region Z3 gathers pulses which correspond to gamma photon detection. The region Z4 gathers noise pulses.

As soon as the pulses are discriminated, the counting and smoothing module MC calculates the respective counting rates $C_n$ and $C_\gamma$ for neutron detection and for gamma photon detection.

The invention claimed is:

1. A scintillator for detecting neutrons and/or gamma photons, characterised in that it comprises a structure consisting of two undoped plastic materials for detecting neutrons and which contain different fluorescent complexes, a first plastic material (A) containing at least one fluorescent complex able to produce a fluorescence light having a first relaxation time and a second plastic material (B) containing at least one fluorescent complex able to produce a fluorescence light having a second relaxation time higher than the first relaxation time, both plastic materials being arranged
   as a stack of successive layers, a layer of one of the first and second plastic materials (A, B) alternating with a layer of another of the first and second plastic materials (B, A), each layer of plastic material having a thickness substantially between 100 μm and 500 μm.

2. The scintillator according to claim 1, wherein the second relaxation time is at least ten times higher than the first relaxation time.

3. The scintillator according to claim 1, wherein the first and second plastic materials are polystyrene or polyvinyltoluene.

4. A neutron and/or gamma photon detector, characterised in that it comprises a scintillator (Sc) according to claim 1, which delivers a fluorescence signal when a neutron or gamma photon is detected, a photomultiplier (PM) which converts into an electronic pulse the fluorescence signal delivered by the scintillator and a discriminating module (MD) able to discriminate, from a shape of the electronic pulse delivered by the photomultiplier, whether a neutron or a gamma photon has been detected.

5. A scintillator for detecting neutrons and/or gamma photons, comprising a structure consisting of two undoped plastic materials for detecting neutrons and which contain different fluorescent complexes, a first plastic material (A) containing at least one fluorescent complex able to produce a fluorescence light having a first relaxation time and a second plastic material (B) containing at least one fluorescent complex able to produce a fluorescence light having a second relaxation time higher than the first relaxation time, a set of micro-beads (b) made of one of the first plastic material (A) and the second plastic material (B) being inserted in a block (M) made of the other one of the first plastic material (A) and the second plastic material (B), the micro-beads (b) inserted in the block (M) defining a cube lattice, the diameter of the micro-beads (b) being substantially between 100 μm and 500 μm and two neighbouring micro-beads being separated by a distance substantially between 100 μm and 500 μm.

6. The scintillator according to claim 5, wherein the second relaxation time is at least ten times higher than the first relaxation time.

7. The scintillator according to claim 5, wherein the first and second plastic materials are polystyrene or polyvinyl-toluene.

8. A neutron and/or gamma photon detector, comprising a scintillator (Sc) according to claim 5, which delivers a fluorescence signal when a neutron or gamma photon is detected, a photomultiplier (PM) which converts into an electronic pulse the fluorescence signal delivered by the scintillator and a discriminating module (MD) able to discriminate, from a shape of the electronic pulse delivered by the photomultiplier, whether a neutron or a gamma photon has been detected.

\* \* \* \* \*